(12) United States Patent
Shiue et al.

(10) Patent No.: US 9,174,859 B2
(45) Date of Patent: Nov. 3, 2015

(54) METHOD FOR TREATING WASTE WATERS

(75) Inventors: Lih-Ren Shiue, Hsinchu (TW); Dzung-Shi Chang, Hsinchu (TW); Jian-Peng Guan, Hsinchu (TW); Ted Hung, Hsinchu (TW); Mu-Fa Chen, Hsinchu (TW)

(73) Assignee: ECO WATERTECH, INC., Hsinchu (TW)

( * ) Notice: Subject to any disclaimer, the term of this patent is extended or adjusted under 35 U.S.C. 154(b) by 1014 days.

(21) Appl. No.: 13/304,401

(22) Filed: Nov. 24, 2011

(65) Prior Publication Data
US 2013/0134080 A1 May 30, 2013

(51) Int. Cl.
| | |
|---|---|
| C02F 1/78 | (2006.01) |
| C02F 1/463 | (2006.01) |
| C02F 1/467 | (2006.01) |
| C02F 1/48 | (2006.01) |
| C02F 103/00 | (2006.01) |
| C02F 103/24 | (2006.01) |

(52) U.S. Cl.
CPC ............... *C02F 1/463* (2013.01); *C02F 1/4672* (2013.01); *C02F 1/481* (2013.01); *C02F 1/484* (2013.01); *C02F 1/78* (2013.01); *C02F 2103/008* (2013.01); *C02F 2103/24* (2013.01); *Y02W 10/37* (2015.05)

(58) Field of Classification Search
CPC ........ C02F 1/463; C02F 1/4672; C02F 1/481; C02F 2103/24; C02F 1/78; C02F 2103/008
USPC ........ 210/143, 192, 748.01, 748.12; 204/673, 204/194, 242; 205/695, 742
See application file for complete search history.

(56) References Cited

U.S. PATENT DOCUMENTS

| | | |
|---|---|---|
| 4,713,195 A | 12/1987 | Schneider |
| 4,839,007 A | 6/1989 | Kotz et al. |
| 4,913,826 A | 4/1990 | Mannig et al. |
| 5,472,619 A | 12/1995 | Holzhauer et al. |
| 6,179,987 B1 | 1/2001 | Tsouris et al. |
| 6,190,566 B1 | 2/2001 | Kolber |
| 6,358,398 B1 * | 3/2002 | Halldorson et al. .......... 205/754 |

(Continued)

OTHER PUBLICATIONS

Wang et al., J Electrochem. Soc., vol. 152(11), pp. D197-D200 (2005).

(Continued)

*Primary Examiner* — Walter D Griffin
*Assistant Examiner* — Cameron J Allen

(57) ABSTRACT

A chemical-free and no-microbe method for pre-treating a broad range of waste waters is presented. The said method involves electrocoagulation (EC) operated in synchronization with electrolytic ozone ($EO_3$). In the combinatory method, each technique not only applies its own treatments, they also create synergistic effects from real-time reactions among the reagents generated by electrolysis. Two refractory waste waters, seawater and tannery effluent, are tested by the combinatory method, $EC+EO_3$, to assess the viability of the said method. Without adjustment, each of the said waste waters is remedied by $EC+EO_3$ from its raw state to a clean condition more effectively and more economically than that can be delivered by the respective prevailing processes of pretreatment for each of the said waste waters.

16 Claims, 7 Drawing Sheets

(56) References Cited

U.S. PATENT DOCUMENTS

| | | |
|---|---|---|
| 6,649,067 B2 | 11/2003 | Overath |
| 6,984,295 B2 | 1/2006 | Shiue et al. |
| 7,670,493 B2 | 3/2010 | Bolam |
| 7,862,727 B2 | 1/2011 | Blandford et al. |
| 7,931,809 B2 | 4/2011 | Constantz |
| 7,985,327 B2 | 7/2011 | Christensen et al. |
| 2002/0011436 A1* | 1/2002 | Blanchette et al. ........ 210/198.1 |
| 2002/0061265 A1* | 5/2002 | Conrad .................... 422/186.07 |
| 2003/0062321 A1* | 4/2003 | Kitayama et al. ............. 210/748 |
| 2003/0173300 A1* | 9/2003 | Bradley ........................ 210/665 |
| 2004/0251213 A1* | 12/2004 | Bradley ........................ 210/748 |
| 2005/0218081 A1* | 10/2005 | Dmitriev et al. .............. 210/702 |
| 2007/0272550 A1* | 11/2007 | Shiue et al. ................... 204/267 |

OTHER PUBLICATIONS

Ning et al., Desalination and Water treatment. vol. 9, pp. 92-95 (2009).

Timmes et al., Desalination, vol. 250, pp. 6-13 (2010).

* cited by examiner

METHOD FOR TREATING WASTE WATERS

BACKGROUND OF THE INVENTION

1. Field of the Invention

This invention relates to a combination of two electrochemical techniques into a multi-effects method for pre-treating miscellaneous wastewaters. More specifically, the invention relates to electrocoagulation (EC) and electrolytic ozone ($EO_3$) working simultaneously for quick abatement of the major pollution indices including COD, coloration, TSS, TOC, heavy metals, microorganisms and TDS of the treated waters without using chemicals and/or microbes.

2. Background of the Related Art

Water is vital to the survival of all life on the earth. Regardless of the water sources, water often requires some form of purification before use. Purification of water, or water treatment, is determined by the goals of end-use, such as, irrigation, aquatic cultivation, industrial production, or human consumption. Water can always be treated to the desired level of purity but, at a cost. When deciding a water-treatment protocol, one needs to consider the following factors: capital cost, power consumption, maintenance, throughput, foot-print area, secondary pollution, as well as post-treatment cost. Practically, capital cost and energy consumption are two most essential factors.

Seawater covers about 71% of the earth's surface, and it is the most abundant source of water. When water becomes scarce, people frequently look to the sea or ocean for water. Nevertheless, seawater is a complex waste water with average salinity of about 30 to 38 parts per thousand (ppt), or 30,000 to 38,000 parts per million (ppm), or 3.0 to 3.8%. The salinity of water is also referred as total dissolved solids (TDS) which is associated with water conductivity. In the 10 principal inorganic salts of seawater, the leading 2 ions are $Cl^-$ (55.04%) and $Na^+$ (30.61%), followed by $SO_4^{2-}$, $Mg^{2+}$, $Ca^{2+}$, $K^+$, $HCO_3^-$, $Br^-$, $BO_3^{3-}$ and $Sr^{2+}$ to constitute 99% of the seawater salinity collectively. Besides the normal organic matter (NOM), seawater contains other organic materials depending on the estuary where seawater is taken for desalination. Distillation and reverse osmosis (RO) are the two most popular techniques for desalination around the world. For protecting boilers, heat exchangers and RO membranes from fouling by the inorganic salts and organic matters in seawater, various antiscalants or scale inhibitors, inorganic acids/bases, coagulants/precipitation agents and oxidants are employed for pre-treating the seawater as taught in U.S. Pat. No. 4,713,195; U.S. Pat. No. 7,862,727; and U.S. Pat. No. 7,931,809, as well as in Ning et al., Desalination and Water Treatment, Volume 9, pp 92-95 (2009), just to name a few. Distillation and RO are energy-thirst techniques, while distillation spends energy on heating seawater, RO consumes energy in the form of high pressure to extract freshwater out of seawater. In addition to power consumption, the use of chemicals and polymers in the pretreatments not only escalates the operation cost, but it also add burden to environment and post-treatments. Especially, RO expels treated water more polluted than the feed water to the sea, which causes severe damage to the ecology of discharge area.

Leather tanning is a centuries-old industry which provides materials for making shoes, furs/clothing, furniture, gloves, bags and belts. Leather is made from raw hide or skin, a byproduct of the meat industry, requiring an intensive use of water in many mechanical and chemical processing steps. For processing 850 Kg raw hide, it generally consumes 25-50 $m^3$ of water and 150 Kg chemicals resulting in 250 Kg finished leather with 25-50 $m^3$ waste water and 600 Kg solid wastes. Apparently, there are 150 Kg chemicals and 600 Kg solids dissolved or dispersed in the effluent needed to be removed prior to the discharge or re-use of the water. Although modern tannery fabrication techniques have significantly reduced the usage of water and metal, the tannery effluent is still a highly contaminated and hard-to-treat waste. Virtually all tannery effluents are black in color filled with fat, oil, grease (FOG), high SS (suspended solids, up to 3,000 ppm), high sulfide (strong foul smell), high COD (chemical oxygen demands, up to 50,000 ppm), high TKN (total Kjeldahl Nitrogen) and high TDS (up to 90 ppt). The pretreatment of tannery effluent includes flotation of FOG by dissolved air for skimming, and oxidation of sulfides by liming and aeration as taught in U.S. Pat. No. 4,913,826; U.S. Pat. No. 5,472,619, U.S. Pat. No. 6,649,067 and U.S. Pat. No. 7,670,493. In the pretreatment, a huge amount of power is spent on driving pumps, blowers, mixers and dryers (dehydrators). Furthermore, the process employs several large pools for outdoor exposure and flotation, which is space demanding and lack of sanitation. In the following primary and secondary treatments of tannery effluent, precipitation agents, coagulants and bacteria are extensively applied resulting in secondary pollution and high cost for handling the sludge produced.

Seawater and tannery effluent serve as two stubborn liquids for proving the principle and performance of the combinatory technique, $EC+EO_3$, as a viable pretreatment method for remedying waste waters. The instant invention will present data on treating seawater and a tannery effluent by $EC+EO_3$ using only electricity. As no chemical or microbe is involved in the treatments, the sludge formed in treating each of the said waste waters is a useful resource, an added value to the treatments by $EC+EO_3$. The $EC+EO_3$ treatment is also fast, energy effective and pollution free.

SUMMARY OF THE INVENTION

Seawater and tannery effluent serve as two stubborn liquids for proving the principle and performance of the combinatory technique, $EC+EO_3$, as a viable pretreatment method for remedying waste waters. The instant invention will present data on treating seawater and a tannery effluent by $EC+EO_3$ using only electricity. As no chemical or microbe is involved in the treatments, the sludge formed in treating each of the said waste waters is a useful resource, an added value to the treatments by $EC+EO_3$. The $EC+EO_3$ treatment is also fast, energy effective and pollution free.

The present invention combines the EC treatment with real-time supply of ozone from $EO_3$ as a pretreatment method for miscellaneous waste waters. In some cases, the combinatory method, $EC+EO_3$, is the only technique needed for treating some waste waters to the desired level of purity. EC and $EO_3$ use electrolysis of metal and water, respectively, on different electrodes and cell configuration at different power rates for water treatment. Thus, the reactors of EC and $EO_3$ are two independent systems involving in-situ generation of active reagents, metal ions from EC whereas gases and radicals from $EO_3$, for in-situ eradication of contaminants in the water treated. Working alone, EC and $EO_3$ can only decontaminate waters to a certain degree of purity at a period of time. However, when the metal ions of EC meet the gases and radicals of $EO_3$ in real-time rate, the resulted agents can impart $EC+EO_3$ treating capability and treating capacity at several orders of those delivered by EC or $EO_3$. It is the first objective of the present invention to offer $EC+EO_3$ as a viable alternative to the prevailing pretreatment methods that depend heavily on chemicals and microbes wherein large foot-print and lengthy treatment are required.

Generally, iron (Fe) and aluminum (Al) are the two most common metals used as the sacrificial anode for EC, and the cathode can also be Fe or Al. In other words, EC may use either different metals or same kind of metals for its anode and cathode. Regardless of the electrode material, EC can be driven on direct current (DC) or alternating current (AC). When an AC power is employed, the electrodes of EC reactor will take turns to serve as the sacrificial anode to provide the metal ions or cations for coagulation, and all electrodes may be consumed evenly. On the other hand, if EC is operated on a DC power, the electrodes can be arranged in bipolar configuration using Fe and Al in an alternating order. Thence, both cations of Fe and Al can be present to handle wastewaters with wide ranges of chemistry. Ozone can enhance the treating power of aluminum ion ($Al^{3+}$), and ferrous ion ($Fe^{2+}$) as well. Furthermore, in the presence of $O_3$, $Fe^{2+}$ can be oxidized quickly to ferric ion ($Fe^{3+}$), hydroxyl radical (.OH), ferrate ($FeO_4^{2-}$) and ferryl species $[Fe(IV)O]^{2+}$. Both of the latter two ions, Fe(IV/VI), are highly unstable and soon they will return to the stable states of Fe ions, Fe(II/III). It is the fast reduction of Fe(IV/VI) making them as oxidants more potent than $O_3$, and the ions also impart $EC+EO_3$ 3 to 5 orders of magnitude faster than EC or $EO_3$ working alone on reducing $SS/coloration/COD/BOD/S^{2-}/TKN/TDS$ . . . etc of waste waters. For achieving the synergistic effects, the concentration of $O_3$ provided to the $EC+EO_3$ treatment should be at least 20 times of that of $Fe^{2+}$. The desirable dosage of $O_3$ can be easily managed by adjusting the operation power of $EO_3$.

Different from the conventional generation of $O_3$ by corona discharge and other electrolytic ozone designs, $EO_3$ of the present invention has the following uniqueness and advantages:
1. No ion-exchange membrane is required,
2. Any water including waste waters may serve as the source of ozone,
3. No hazardous or precious metal in the catalyst of ozone anode,
4. Low operation voltages (24 V DC or lower),
5. Throughput of ozone is proportional to the power densities applied, and
6. Large operation current needs are fulfilled by supercapacitors.

The key to the success of $EO_3$ of the present invention is the catalyst of ozone anode. A publicized recipe of ozone-formation catalyst is re-formulated, which is assisted with a proprietary fabrication-protocol developed in-house, to fit the needs of the present invention.

In the integration of EC and $EO_3$ treatments, the natures of waste waters will decide the operation modes of $EC+EO_3$. As some contaminants may adhere or deposit on the ozone anode causing permanent damages to the catalyst, the $O_3$ gas is withdrawn from $EO_3$ reactor into the EC chamber for treating waste waters containing such contaminants. Due to the close proximity of two reactors, the delivery of ozone is so prompt and continuous that the formation of aforementioned synergistic effects is as effective as the electrodes of EC and $EO_3$ being disposed in a same container. In another mode of $EC+EO_3$ treatment, the intake waste water is first treated in the EC chamber, after filtration, the EC-treated water is flown into the $EO_3$ reactor for direct reactions with gases, radicals and electrodes therein. At the mean time, the ozone gas is drawn to the upstream EC chamber for forming the synergistic effects. For the water used to produce $O_3$ gas in the $EO_3$ reactor is the intake waste water itself, the $EC+EO_3$ system is self-contained.

Another objective of the present invention is to offer an effective way for handling the sludge formed in the $EC+EO_3$ treatment, namely, the separation of sludge from purified water and the disposal of sludge. In the pretreatment of seawater by $EC+EO_3$, there is magnetite ($Fe_3O_4$) formed in the sludge with other metals, notably, magnesium (Mg) and calcium (Ca), which take 3.69% and 1.16%, respectively, of the inorganic salt present in seawater. By means of the ferromagnetism of magnetite, the sludge can be easily separated from the treated seawater using a magnetic field, for example, a permanent magnet or an electromagnet. After drying the sludge cake at low temperatures, the solid becomes an ore that contains a high concentration of Mg ready for recycling. The recovery of Mg from the sludge of $EC+EO_3$ treatment is similar to the industrial extraction of Mg from seawater but easier, moreover, the sludge may allow the retrieval of Ca, lithium (Li) and manganese (Mn) as well. In the $EC+EO_3$ treatment of tannery effluent, the sludge, a mixture of organic materials and iron oxides, can be adsorbed on a carrier like diatomite or low-cost activated carbon for easy separation from the purified water, and, the filtered solids can be easily dehydrated into an odorless and nourishing organic-fertilizer.

BRIEF DESCRIPTION OF THE DRAWINGS

The present invention is best understood by reference to the embodiments described in the subsequent sections accompanied with the following drawings.

DETAILED DESCRIPTION OF THE INVENTION

Figure 1:
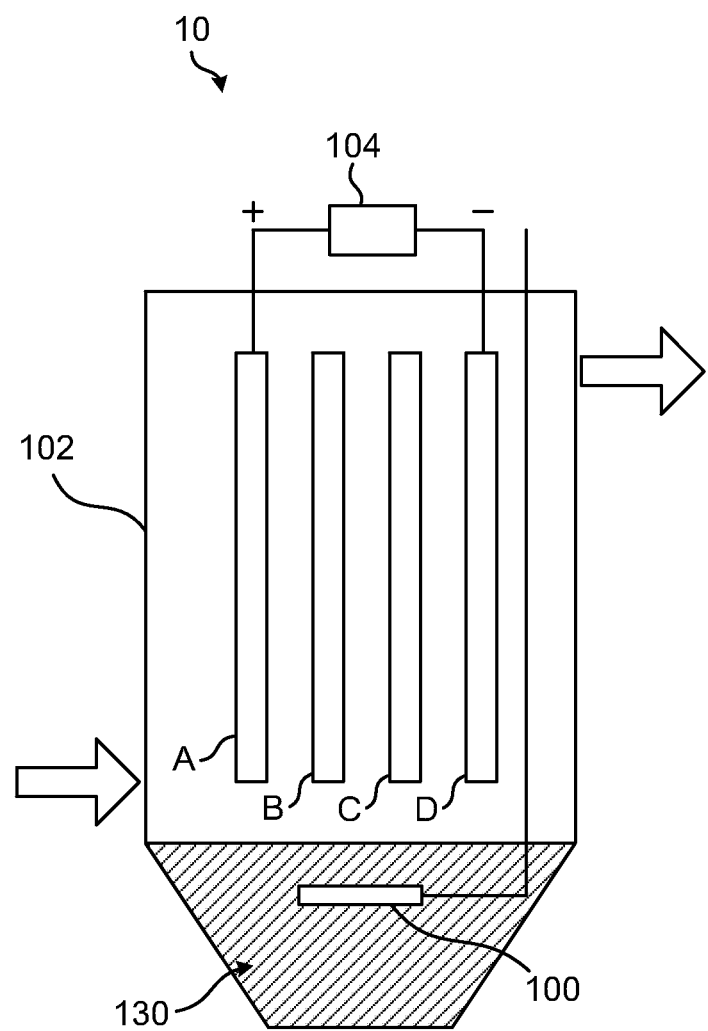
FIG. 1 is a schematic diagram of an EC reactor with four electrodes arranged in bipolar configuration and injection of ozone bubbles through a diffuser according to a preferred embodiment of the invention.

The invention presents an innovative method by combining the reagents of electrocoagulation (EC) and electrolytic ozone ($EO_3$) into a multi-effects means, or $EC+EO_3$, as a pretreatment or the major treatment for miscellaneous waste waters. The novel method involves EC operated in synchronization with ozone produced by $EO_3$. As ozone meets the cations of EC, more potent reactants will be generated leading to an expedite eradication of contaminants in waste waters. To understand the present invention and its merits, introductions of EC and $EO_3$ are given as follows Electrocoagulation (EC)

EC is a 100+ years old (since 1906) technique for water treatment. The practice of EC is very straightforward: by sticking two electrodes into a waste water followed by applying a DC or AC voltage to the electrodes, the electrode receiving positive volt will be dissociated into cations initiating coagulation or precipitation of suspended and dissolved solids in the water. Because EC generates only the cation required for treatments without anion, it is cleaner and more economic than the conventional chemical method. Furthermore, EC electrodes also provide direct oxidation-reduction to the contaminants, which are not available in chemical treatment. As shown in Table 1, EC is capable of removing a significant amount of inorganic, organic, and microbial pollutants.

TABLE 1

Decontamination Capabilities of EC

| Removal Rtes (%) | Contaminants |
|---|---|
| 96-99+ | Al, Ag, Am, Ba, Cd, Ca, Cr, Cu, Fe, Mg, Mn, Ni, Pb, Ra, Si, U, Zn, Bacterium, Total Coliform, Coloration, Petroleum Hydrocarbons, Pesticides, Phosphates, TSS |
| 90-95 | As, $CN^-$, $F^-$, N, Pb, V |
| 70-80 | B, Co, Mo |
| 60-69 | $NH_4^+$, Hg |
| 20-59 | K, Se |
| 0-19 | Na, $Cr^-$ |

The performance of EC treatment is profoundly affected by the anode material. In practice, the composition of waste water will decide which metal is most suitable as the anode. For example, aluminum (Al) should be the anode for treating the wastewaters from food plants and kitchens, and iron (Fe) is the choice of anode on handling textile and tannery waste waters. Salts of Al and Fe, for example, alum $[KAl(SO_4)_2]$ and ferric chloride ($FeCl_3$), are frequently used chemicals in the conventional water treatments. Henceforth, Al and Fe have become two of the most popular anodes for EC. After an anode material is chosen for treating a specific type of waste water, the EC system may need abrupt adjustments of the pH of intake water, reactor configuration, electrode areas, electrode gaps, power rates and water flow rates to cope with the sudden variation of waste water. The aforementioned variation of effluent may be due to changes in temperature, water usage, reactant dosage or reaction time at the production line. It needs to design the EC system in a high capability so that it can handle any unusual variation in effluent to maintain the system's designed performance, and to operate the system without the need of chemical including pH adjustment.

FIG. 1 shows a preferred embodiment of EC reactor 10 of the instant invention. There are 4 electrodes, A to D, arranged in bipolar configuration in the EC vessel 102. Among the 4 metallic electrodes, A and C are iron or stainless steel, B and D are aluminum. All electrodes are rectangle plates disposed at a constant gap, such as 5 cm. Only electrodes A and D are connected to the positive and negative pole, respectively, of an outer power supply 104. Through the electric conductivity of water, electrodes B and C will become bipolar electrodes, that is, one side of each electrode carries positive polarity and the other side is negative. During the EC treatment, waste water enters the vessel at the bottom portion, and it exits from the upper section of vessel. While the water is in the EC vessel 102, diffuser 100 delivers ozone gas, which is produced in a nearby $EO_3$ reactor 10 (also not shown in FIG. 1). Heavier sludge 130 will settle at the tapered bottom of EC vessel 102 for discharge, yet, there are more particles flowing with water out of the vessel. If a DC voltage is applied across the electrodes A and D, electrode A and the positive sides of electrodes B and C will proceed the cation formation as described in Equations 1 and 2:

$$Fe \rightarrow Fe^{2+} + 2e^- \quad (1)$$

$$Al \rightarrow Al^{3+} + 3e^- \quad (2)$$

When an AC power is employed, all 4 electrodes will contribute to reactions 1 and 2. The theoretical production of $Fe^{2+}$ and $Al^{3+}$ can be calculated from Faraday's 2nd law in Equation 3:

$$\text{Metal ion generated(mg/sec)} = IM/Fne^- \cdot (1000 \text{ mg/g}) \quad (3)$$

Where I is the EC operation current in Amps (coulomb/sec), M is the atomic weight of Fe (55.85 g/mole) or Al (26.98 g/mole), F is the Faraday constant (96,485 coulomb/mole), and $ne^-$ is the number of electron transferred in the reactions (2 for Fe, 3 for Al). On the other hand, the reaction at the cathode is the electrolysis of water as shown in Equation 4:

$$2H_2O + 2e^- \rightarrow H_2\uparrow + OH^- \quad (4)$$

Both of $H_2$ produced and $O_3$ injected will cause turbulence in the EC vessel 102 imparting the following benefits: uniform treatment of water, inhibition of sludge deposition on electrodes, and flotation of froth that is formed by the suspended contaminants and coagulants from reactions 1 and 2. By combining Eq 4 with Eq 1 & 2, respectively, the complete reduction-oxidation or redox of Fe and Al in EC treatment can be expressed as Eq 5 and 6, respectively:

$$4Fe + 10H_2O + O_2 \rightarrow 4Fe(OH)_{3(s)}\downarrow + 4H_2\uparrow \quad (5)$$

$$3Al + 8H_2O \rightarrow Al(OH)_{2(s)}\downarrow + 2Al(OH)_{3(s)}\downarrow + 4H_2\uparrow \quad (6)$$

Equations (5) and (6) have simplified the electrochemical reactions Fe and Al in water. Depending on the pH of water, $Fe^{2+}$ can form a family of iron oxides, or iron corrosion products, including magnetite ($Fe_3O_4$), maghemite ($\gamma$-$Fe_2O_3$), lepidocrocite ($\gamma$-FeOOH), akaganeite ($\beta$-FeOOH), goethite ($\alpha$-FeOOH) and green rust $[Fe^{II}_4Fe^{III}_2(OH).12SO_4.8H_2O]$. Similarly, $Al^{3+}$ can react with $OH^-$ and form $Al(OH)^{2+}$, $Al_2(OH)_2^{4+}$, $Al_6(OH)_{15}^{3+}$, $Al_{13}(OH)_{24}^{2+}$, $Al(H_2O)_6^{3+}$, $Al(H_2O)_6OH^{2+}$ and $Al(H_2O)_4(OH)_2^+$. All foregoing compounds and precipitates of Equations (5) and (6) will enhance the efficiency of EC treatment.

Electrolytic Ozone ($EO_3$)

$EO_3$ has been used for water treatment since 1840. Its history is longer than EC's. Similar to EC, $EO_3$ also requires at least two electrodes to serve as anode and cathode. Nevertheless, the electrodes of $EO_3$ can only be used in the mono polar configuration. Furthermore, the anode has to be always connected to the positive pole of a DC power supply. The reason that the anode of $EO_3$ must be charged a positive power is a reduction-sensitive catalyst coated on the $EO_3$ anode. Had the anode been misconnected, the catalyst coated thereon would be forever ruined. In the electrolysis of water, oxygen gas will be formed at anode and hydrogen gas at cathode as depicted in Equations (7) and (8):

$$\text{Anode reaction: } 2H_2O \rightarrow O_2\uparrow + 4H^+ + 4e^- \quad E°=1.23V \quad (7)$$

$$\text{Cathode reaction: } 2H_2O + 2e^- \rightarrow H_2\uparrow + OH^- \quad E°=0.0 V \quad (8)$$

Where E° is the standard electrode potential required for the evolution of the corresponding gas. If ozone is desired, it needs a higher E° for electrolyzing water as shown in Equation 9:

$$\text{Anode reaction: } 2H_2O \rightarrow O_3\uparrow + 6H^+ + 6e^- \quad E°=1.60V \quad (9)$$

Using an anode material that has an oxygen-evolution-potential, or oxygen overpotential, higher than the E° of Eq 9, to electrolyze water, $O_3$ will be co-produced with $O_2$ on the anode. Although a number of precious metals, such as, platinum (Pt), palladium (Pd), gold (Au), and several carbonaceous materials, for example, glassy carbon, graphite and boron doped diamond (BDD), possess high oxygen overpotential, they produce insufficient ozone for water treatment, and their cost is too high to be viable. The practical catalyst for ozone generation via the electrolysis of water may be found in a group of metal oxides including β-form lead oxide (β-$PbO_2$), iridium oxide ($IrO_2$) and doped tin oxide ($SnO_2$).

As disclosed in U.S. Pat. No. 4,839,007 issued to Kötz et al., the $O_2$ overpotential of Pt anode is 1.55V. Under the same test condition, antimony doped tin oxide ($Sb_2O_5$—$SnO_2$) has an $O_2$ overpotential from 1.75 to 1.97 V, and the $O_2$ overpotential of β-$PbO_2$ is 1.75V. Obviously, $SnO_2$ is a better candidate as $O_3$-formation catalyst than β-$PbO_2$ for the sakes of high reactivity and low toxicity, and $SnO_2$ is preferred over $IrO_2$ on the cost-basis alone. It is known that a dopant like F, Cl, Sb, Mo, W, Nb, Ta or a combination of the above can impart $SnO_2$ conductive. Moreover, addition of a second dopant, like, Fe, Co, Ni, Cu, Rh, Ru or Pd, to $Sb_2O_5$—$SnO_2$ may enhance the catalytic activity of tin oxide. Ni is selected as the second dopant by Wang et al. in J. Electrochem. Soc., Volume 152(11), pp D197-D200 (2005) for making doped tin oxide for $O_3$-generation. Wang et al also claim that the atomic ratio of three metals in Sb—Ni-doped tin oxide (Sb,Ni—$SnO_2$) should be Sn:Sb:Ni=1000:16:2 using water-soluble tin compound, namely, tin chloride ($SnCl_4$.$4H_2O$), as the precursor of tin oxide. The exact formulation of Wang et al is fully adopted by Christensen et al in U.S. Pat. No. 7,985,327. However, to extend the life time of Sb—Ni-doped tin oxide (Sb,Ni—$SnO_2$) catalyst, also to increase the efficiency of $EO_3$ cell, patent '327 has taught the following modifications:

Add an inter layer of Sn/Sb at 100:10 between Ti substrate and the catalyst.

Add a third dopant, gold (Au) or lead (Pb) to Sb,Ni—$SnO_2$.

Insert an ion-exchange membrane between the anode and cathode.

While the inclusion of expensive Au and vulnerable membrane in $EO_3$ will increase the capital cost along with a shorter service life for $EO_3$ cell, Pb is an environmental hazard banned from drinking water. Moreover, the membrane prevents the $EO_3$ cell from contacting contaminated waters for direct treatment. Referring to the article of Wang et al as a reference, the instant invention has conducted drastically different alterations as follows:

1) The precursor of tin oxide is switched from tin chloride ($SnCl_4$.$4H_2O$) to a tin carboxylate compound. The elimination of chloride ($Cl^-$) can prevent $Cl^-$ corrosion to the catalyst film, as well as the formation of HCl fume during the fabrication of catalyst film.
2) The atomic ratio of Sn:Sb:Ni is changed from 1000:16:2 to a range from 800:20:2 to 500:20:2. Relative to Sn, the contents of Sb and Ni are significantly increased for extending the life time of Sb,Ni—$SnO_2$ catalyst, which is measured by the catalytic activity.
3) The life time of Sb,Ni—$SnO_2$ catalyst is further prolonged by a meticulous control on the preparation of the catalyst-forming solution, as well as on the fabrication protocol that involves a plural number of coating-drying-sintering cycles under a temperature program.
4) Using stainless steel as cathode (Pt is used as cathode by Wang et al) to couple with the anode made of Sb,Ni—$SnO_2$ on titanium (Ti/Sb,Ni—$SnO_2$) without membranes inserted between the anodes and cathodes.
5) $EO_3$ is a water-treatment technique of low operation-voltage (24 volt or lower) and high operation-current (2 mA/$cm^2$ or higher). As a large area of electrodes is required for desalination and treatments of industrial wastes, these operations require a huge amount of current. The needs of large current are fulfilled by supercapacitors, which is first proposed in the U.S. Pat. No. 6,984,295 issued to the first inventor of the instant invention. By means of the power-amplification of supercapacitors, DC power supplies of low power-rates can be employed for a large $EO_3$ system to reduce the capital cost. The supercapacitor suitable for $EO_3$ application should have a working voltage of 30V with capacitance at 20 F (farad) or higher.

Figure 2:
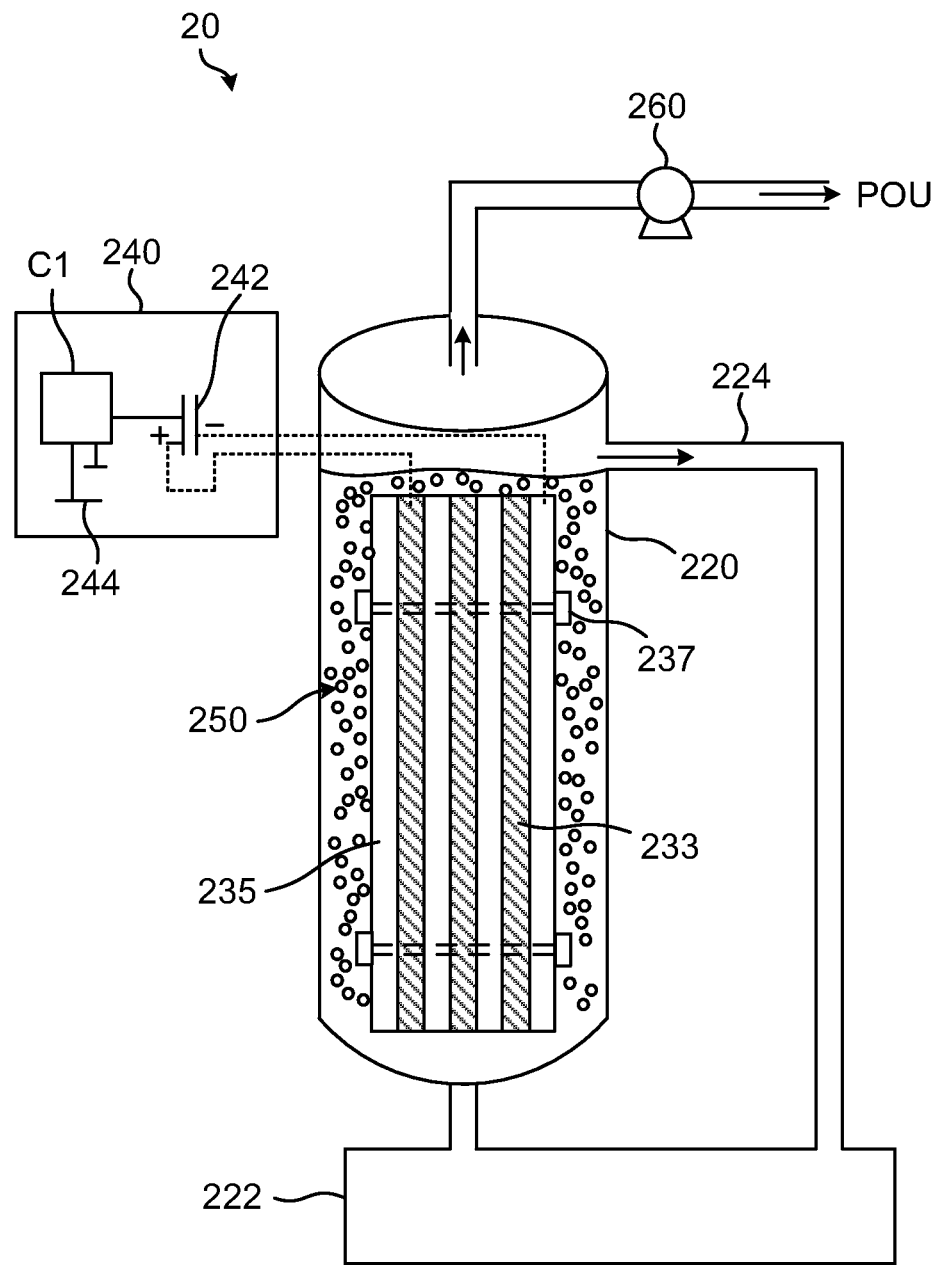
FIG. 2 is a schematic diagram of an independent $EO_3$ reactor equipped with a circulation of water as the source of ozone and an evaluation system for transferring ozone gas to a point of use according to a preferred embodiment of the invention.

FIG. 2 shows a preferred embodiment of the $EO_3$ generator 20 of the instant invention. There are 3 zones of operation in the sustainable reactor of $O_3$-generation of FIG. 2. The first zone is comprised of $EO_3$ vessel 220 and water reservoir 222 that supplies the precursor of $O_3$. Inside the $EO_3$ vessel, there is a stack of electrodes containing 3 anodes, represented by 233 in slanted bars, and 4 cathodes, represented by 235 in clear long bars. For the best results, each anode 233 is sandwiched by two cathodes 235 at a fixed distance from 0.8 to 1.0 mm provided by non-conductive spacers wherein the whole parallel pack is secured by bolts and screws designated as 237. All electrodes are rectangular plates with a plural number of perforated holes in preferred patterns thereon (not shown in FIG. 2). All anodic plates are combined electrically in a pack for connecting to the positive pole of an outer DC power supply, and all cathodic plates are linked in the same way for linking to the negative pole of the same power supply. As the electrode assembly of $EO_3$ is virtually open, the anodic gases, $O_2$/$O_3$, and cathodic gas, $H_2$, can fully mix and react, which has no detrimental effect to the performance of $EO_3$. Tap water or other fresh water is circulated between $EO_3$ vessel 220 and water reservoir 222 via the return conduit 224. The aforementioned electrode gases and water vapor can be withdrawn from the top of $EO_3$ vessel to any point of use (POU) by a vacuum pump 260. The vacuum pump 260 and its accessories constitute the second operation zone of FIG. 2. Actually, $O_3$ is directly formed in micro sizes in water, but they are depicted in large circles represented by 250 for clarity. The dissolution of $O_3$ in water is dependent of the water temperature, the lower the temperature the more the gas will be in water. In any event, only 0.3% of $O_3$ produced by $EO_3$ will dissolve in water and the rest will remain in gaseous state. The vacuum pumping 260 is doing more than just the delivery of $O_3$ to a POU, it also inhibits the build up of calcium carbonate ($CaCO_3$) on the cathodes and bubble deposition on electrodes. With the coverage of the scale on cathodes, $EO_3$ will lose its performance eventually. Also, the cumulation of gas bubbles on the electrode surface is detrimental to both anodes and cathodes.

As seen in FIG. 2, block 240 in dotted square is the third operation zone for providing the DC power needed for $O_3$ generation. Depending on the designed power-rates, block 240 may contain one or a bank of supercapacitors 242, circuit C1 for controlling the charge-discharge of supercapacitors, and a DC power source 244, for example, batteries, solar/wind energies, fuel calls, generators or city grids, for charging supercapacitors. By the commands of circuit C1, power source 244 can apply a pre-determined low-current to charge the supercapacitor 242. Then, the capacitors can amplify the charging currents into larger currents for delivery to anodes and cathodes of $EO_3$ to produce $O_3$ as planned. Through the adjustments of total electrode area submerged in water, the power rates of supercapacitor, and the discharge frequency of supercapacitor, the throughput of ozone, measured in g/hour or Kg/hour, can be custom-made to meet all application needs. Our in-house studies show: when the $EO_3$ electrodes receive a power density of 0.1 W/cm² (10V×10 mA/cm²), $O_3$ throughput is measured as 0.4 mg $O_3$/cm²·min. Based on the foregoing throughput, the $EO_3$ system can be designed accordingly. The supercapacitor bank for the system can be built based a unit capacitor with an electric specification of 30V/20 F.

Combinatory Treatment EC+$EO_3$

As the anodes of EC are consumable, they can be disposed in any waste waters for direct treatment. Nevertheless, the EC cell as FIG. 1 can provide two types of cation to increase the treating capability of EC, it is still limited by reaction rates. In the chemical coagulation using ferrous chloride ($FeCl_2$) as the coagulant, when hydrogen peroxide ($H_2O_2$) is added, hydroxide radical (.OH) will be formed by the reaction between peroxide and $Fe^{2+}$ as described in Equation 10:

$$Fe^{2+}+H_2O_2 \rightarrow Fe^{3+}+.OH+OH^- \quad (10)$$

The .OH radical is more potent than $Fe^{3+}$ that the treatment with $H_2O_2$, also known as the Fenton's reaction, is faster than $Fe^{3+}$ working alone. Since $O_3$ is an oxidant more powerful than $H_2O_2$, the combination of $O_3$ and coagulants generated by EC should perform better than either EC-only or the Fenton reaction. The forgoing logic is validated in the instant invention, and the performance of EC+$EO_3$ is shown in treating seawater and tannery effluent.

Figure 3:
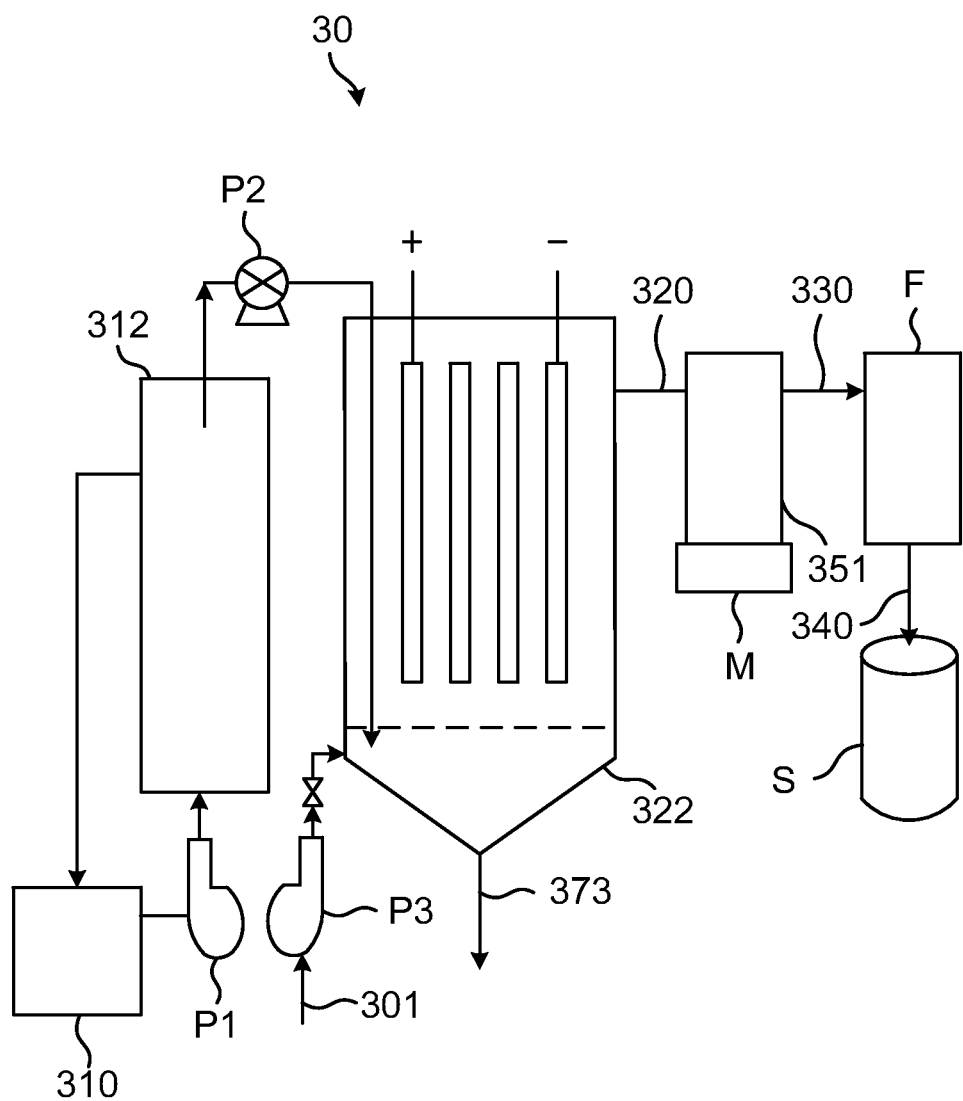
FIG. 3 is an injection mode of $EC+EO_3$ treatment wherein ozone gas is drawn form $EO_3$ reactor into EC chamber for generating synergistic effects to expedite the treatment of waste waters.

FIG. 3 shows a preferred embodiment of injection mode 30 for applying the EC+$EO_3$ treatment. In FIG. 3, $EO_3$ vessel 312 is an unit designated specifically for generating $O_3$ (the power supply is not shown in FIG. 3) using tap water or other freshwater stored in reservoir 310 wherein water is circulated between the generator and the reservoir by water pump P1. In order to prevent the precursor of $O_3$ from over-heating, reservoir 310 is made of metal for heat dissipation, and a water-level monitor is installed in the reservoir 310 to ensure that the amount and temperature of water are adequate. Same as FIG. 2, there is also a vacuum pump P2 in FIG. 3 for transferring $O_3$ gas to EC vessel 322. Waste water designated as 301 is pumped by pump P3 into EC vessel 322 from an inlet located at a lower portion of vessel. The valve above the intake pump of water 301 is provided for batch-wise or continuous treatment of waste water 301. There are 4 electrode plates, 2 each for Fe and Al, arranged in bipolar configuration and alternating order (same as FIG. 1) at 5 cm or larger separation. During the EC+$EO_3$ treatment, heavier sludge will settle at the bottom of EC vessel 322 for removal from discharge port 373. Lighter sludge and froth will flow with water and they exit the EC vessel from outlet 320 to retention tank 351. There is a magnetic field provided by a permanent magnet M or electromagnet M under the retention tank to attract and to hold the ferromagnetic sludge. With the assistance of magnetic separation, the clarified supertanant is drawn from outlet 330 (pump is not shown in FIG. 3) into filter F, such as, microfilter or ultrafilter, for further purification. After filtration, the clean water is released from outlet 340 and saved in storage tank S. $O_3$ produced by corona discharge is compared with $O_3$ from $EO_3$ on practicing the EC+$EO_3$ treatment, the results are similar except the latter is more effective. Because of the close proximity to EC reactor and difference of the efficiency of $O_3$ generation (4% in corona discharge vs 30% in $EO_3$), $EO_3$ outperforms the corona discharge in water treatment.

Figure 4:
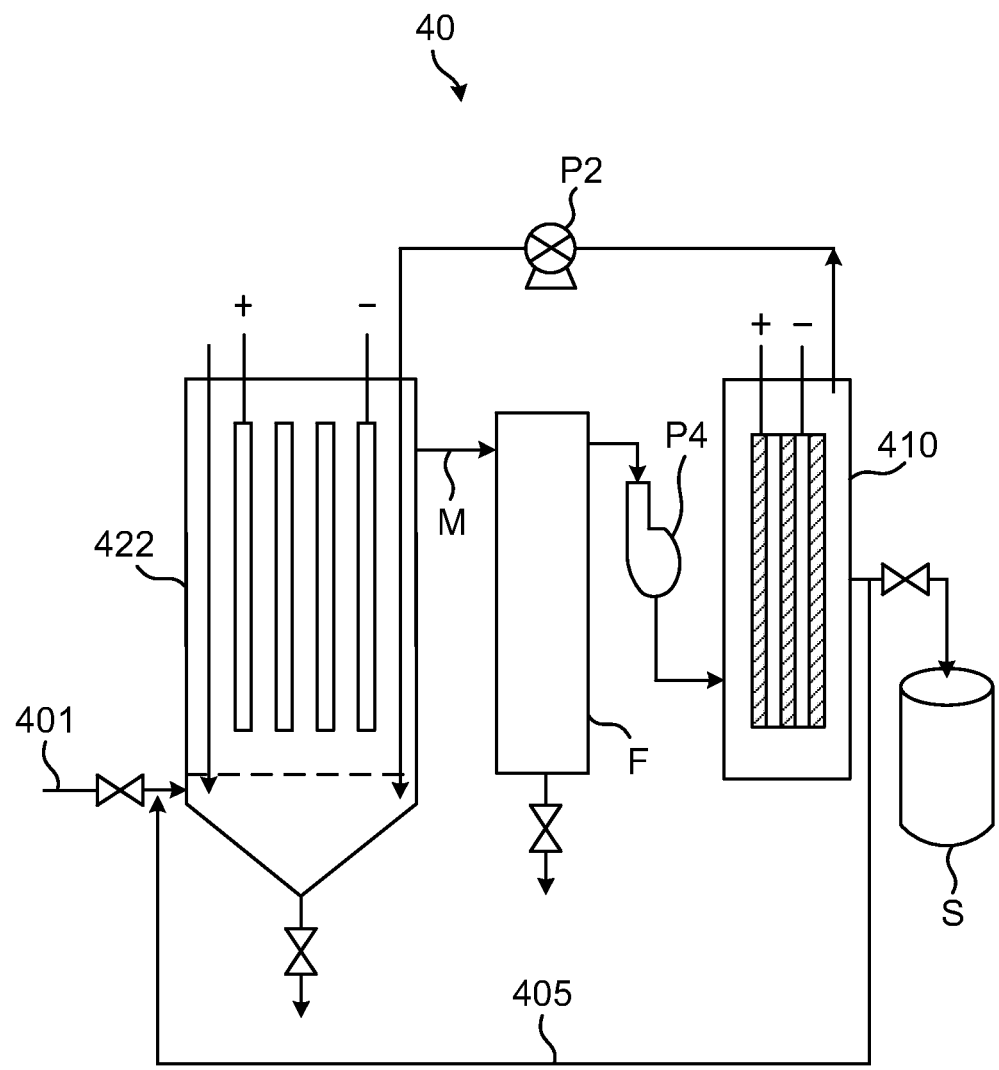
FIG. 4 is a self-contained mode of $EC+EO_3$ treatment wherein waste water is first treated by EC to become an internal and incessant supply of water for producing ozone gas in $EO_3$ reactor.

The EC+$EO_3$ treatment via injection mode as FIG. 3 is applied to waste waters containing pollutants that may permanently adhere to anode or damage Sb,Ni—$SnO_2$ catalyst, for example, petroleum oil, grease, varnish, high level of $Cl^-$, strong acids and string bases. When the aforementioned contaminants are first eradicated by EC to an acceptable level, the treated water can then be treated by $EO_3$ in tandem with EC as shown in FIG. 4. Therefore, FIG. 4 represents the self-contained mode 40 of EC+$EO_3$ treatment, wherein the precursor of $O_3$ is produced internally and constantly. Same as the injection mode, waste water 401 is fed by a pump (not shown in FIG. 4) through a valve, which decides batch-wise or continuous treatment, into the EC vessel 422 for treatment. Sludge generated in the EC vessel 422 will be either precipitated and discharged through the valve under the vessel, or retained by a magnetic field M followed by filtration in filter F and discharge from the valve under the filter. After electrocoagulation and filtration, the treated water is pumped by pump P4 into $EO_3$ vessel 410 for ozonation by a stack of 2 anodes and 3 cathodes, as well as for $O_3$ generation. Once purified water is delivered from the first EC treatment to $EO_3$, $O_3$ can be evacuated back to EC reactor to start the EC+$EO_3$ treatment, and thereby the EC+$EO_3$ treated water becomes easier target for the immediate ozonation. After the direct ozonation, if water is determined to meet the goal (online monitor is not shown in FIG. 4), it will be released from outlet 420 and saved in storage tank S for use. Otherwise, water will be turned to EC vessel 410 via conduit 405 for repeated EC+$EO_3$ treatment and ozonation.

Each of EC and $EO_3$ has its unique actions on treating waters. Basically, EC treatment mainly involves physical reactions, while $EO_3$ treatment is purely the oxidative reactions of $O_3$. Although EC can decontaminate waters faster than $EO_3$, yet, $EO_3$ can purify water to a cleaner state than EC. The power of $EO_3$ comes from the multiple derivatives of $O_3$. As the anodic gases, $O_3/O_2$, and the cathodic gas, $H_2$, are not separated in the instant invention, $O_3$ can react with $H_2$ to form hydrogen peroxide ($H_2O_2$). Moreover, singlet oxygen or nascent oxygen, <O>, and a number of radicals can be formed in the reactions of $O_3$ with water as grossly described in Equation 11:

$$O_3 \rightarrow O_2 + <O>$$

$$2O_3 + 2H_2 \rightarrow 2H_2O_2 + O_2$$

$$O_3 + H_2O \rightarrow 2.OH + O_2$$

$$O_3 + H_2O_2 \rightarrow .OH + .O_2H + O_2$$

$$O_3 + .O_2H \rightarrow .O_3H + O_2 \quad (11)$$

The nascent oxygen, <O>, and free radicals, particularly, .OH, are more highly oxidizing than $O_3$, and they can decompose refractory compounds and oxidize virtually all residual organics completely to $CO_2$ and $H_2O$. Except Au, Pt, Pd and Ir, $O_3$ can oxidize metals to metal oxides in their highest oxidation state. By means of the oxidation, some metal ions become precipitate, such as, $Mn^{2+}$ to $MnO_2$ for easy separation from water. An interesting reaction is the formation of CaO or quicklime by $O_3$, which is converted to hydrated lime [$Ca(OH)_2$] by water dissolution, known as slaking, as described in Equations 12 and 13, respectively:

$$Ca^{2+}+<O> \rightarrow CaO \quad (12)$$

$$CaO+H_2O \rightarrow Ca(OH)_2 + heat \quad (13)$$

Once lime, $Ca(OH)_2$, is present in water, it will begin the softening of water by removing the hardness, such as, $MgCl_2$, $CaCl_2$ and $MgSO_4$, etc. While tap water is used as the precursor of $O_3$ in the instant invention, TDS of ozonated water dropped from 150 ppm to under 80 ppm, which is considered as soft water. Water softening by $EO_3$ is cleaner than liming for $EO_3$ gives no solids and twice amount sludge of lime applied is produced in chemical treatment, also, $EO_3$ is more environment friendly than ion exchange, as $EO_3$ is zero discharge and ion exchange releases excessive sodium ions ($Na^+$) into the sewerage systems.

Equations (5) and (6) show that $Fe(OH)_3$ and $Al(OH)_3$ are the coagulants from using Fe and Al as EC anodes, respectively, for water treatment. Both coagulants are so highly charged precipitates that they can neutralize the negative charge carried by colloidal particles in water. Through the fast charge neutralization, that is, a physical reaction known as coagulation, and other types of bonding including hydrogen bonding, the coagulated solids can agglomerate into flocs. As flocs further grow, they will adsorb more recently coagulated particles and colloids in water. Eventually, the growth of floc, also known as flocculation, will cease as the floc is condensed into a mass heavier than the lifting buoyancy of water. By then, flocs become sludge that can be settled down by gravity. Since the molecular weight of $Fe(OH)_3$ is larger than that of $Al(OH)_3$, Fe is a generally preferred anode material for EC than Al. Regardless of the source of ozone, when $O_3$ is introduced into the EC reactor that provides both $Al^{3+}$ and $Fe^{2+}$, the following synergistic reactions will occur as shown by Equations 14, 15 and 16:

$$Al^{3+}+<O>\rightarrow Al_2O_3 \tag{14}$$

$$2Fe(OH)_3+O_3+4OH^-2FeO_4^{2-}+5H_2O \tag{15}$$

$$Fe^{2+}+O_3\rightarrow[Fe(IV)O]^{2+}+O_2 \tag{16}$$

In Equation 15, the product alumina ($Al_2O_3$) can serve as a binder that can bind coagulants and colloids of water into a compact and strong sludge. On the other hand, Fe(VI) and Fe(IV) formed in Eq (15) and (16), respectively, are oxidants of several-order more potent than $O_3$ and they are capable of eradicating organic contaminants, heavy metals and microbes several-order faster than EC or $EO_3$ working alone. The addition of the synergistic reactions, Equations 14-16, to the EC reactions, Equations 5 and 6, as well as to the $EO_3$ reactions, Equations 11-13, imparts the EC+$EO_3$ treatment a high capability and a high capacity for handling a broad range of waste waters. Not only can this technique treat miscellaneous waters filled with contaminants in various natures, it can also handle all challenges of fluctuation in the pollution level without compromise. Two refractory waste waters, seawater and tannery effluent, are treated by EC+$EO_3$, respectively, to show the "proof of principle" and "proof of performance" of EC+$EO_3$ from using simplified EC reactor and $EO_3$ generator in the following examples.

Two Modes of Combinatory Treatment

Figure 5:
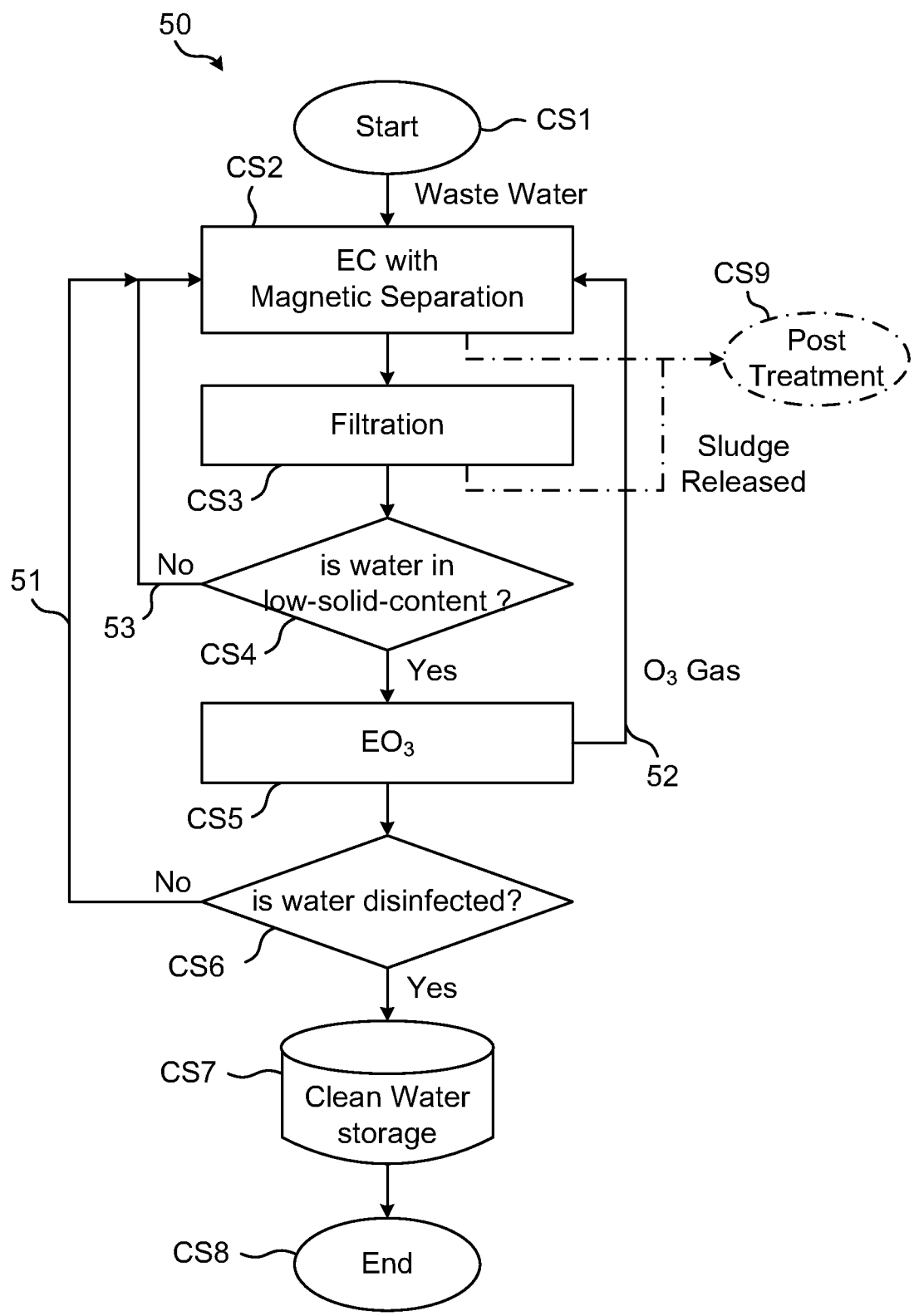
FIG. 5 is a schematic diagram of a series-mode of $EC+EO_3$ technique according to an embodiment of the invention.

Depending on the nature of intake water or liquids, the treatment using EC+$EO_3$ technique can be conducted in two modes. Please refer to FIG. 5. FIG. 5 is a schematic diagram of a series-mode 50 of EC+$EO_3$ technique according to an embodiment of the invention. In FIG. 5, waste waters to be treated do not contain contaminants harmful to the catalyst-coated anode of $EO_3$, the $EO_3$ reactor is in series with the EC reactor. At step CS1 of the series-mode 50, waste water is withdrawn by a water pump into the EC reactor wherein water-borne contaminants subjected to electrolysis and coagulation at step CS2. Sludge formed in the EC reactor is paramagnetic, thus, it is either settled to the bottom of reactor by gravity, or retained by a magnetic field provided by an electromagnet device. After most sludge is removed, the electrolyzed water is filtered at step CS3 using micro-filtration or ultra-filtration, depending on the particle size. At step CS4, the water is judged on its solid content. If the water contains solids more than a predetermined level, it is returned to steps CS2 and CS3 for further treatment via line 53. Water in low-solid-content is flown to the $EO_3$ reactor for ozonation at step CS5. When a clarified water is present in $EO_3$ reactor, the reactor will constantly generate ozone gas. Using a vacuum pump or Venturi tube, the $O_3$ gas will be evacuated, via line 52, into the EC reactor forming the potent Fe(IV/VI) ions leading to expedited oxidation of contaminants. After $EO_3$, the disinfected water is decided at step CS6 on its cleanliness, for repeated series treatments of CS2, CS3 and CS5 via line 51, or for storage at step CS7. Then, the clean water is used at step CS8. Steps CS2 and CS3 may involve the discharge of sludge to post treatment at step CS9. Because of its dryness, sludge formed in the combinatory treatment is facilely converted to solids of value in the post treatment.

Figure 6:
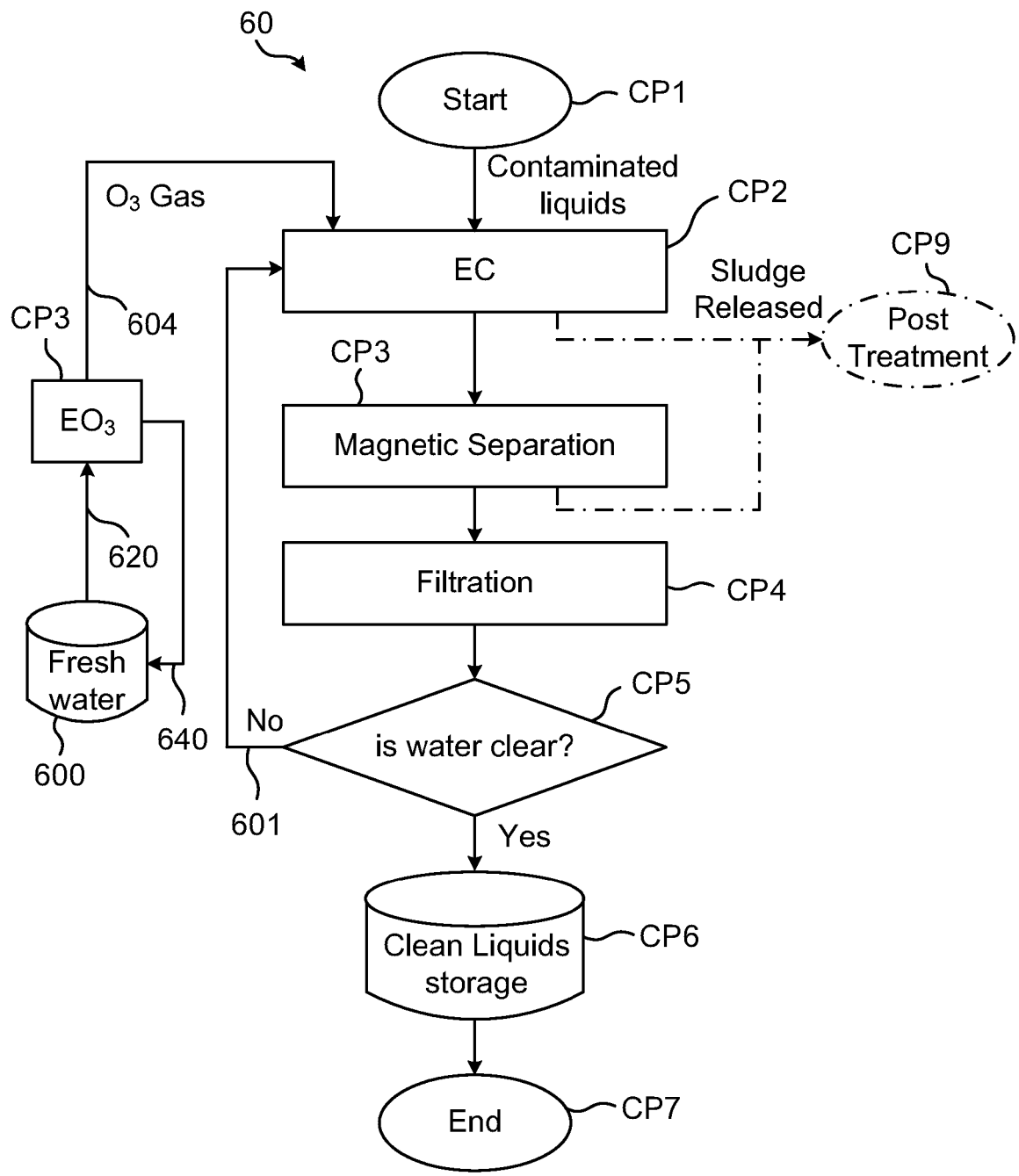
FIG. 6 is a schematic diagram of a parallel mode of $EC+EO_3$ technique according to an embodiment of the invention.

On the other hand, if the liquids for the combinatory treatment belong to the following categories:

Seawater or high salty (TDS>3,000 ppm) brine,
Petroleum, fat, oil, grease (FOG). lacquer, tar,
Organic solvents or organic mixtures of low water content (<5% by weight),
Strong acids and bases in high concentration (>30% by weight), the aforementioned liquids are then treated by a parallel mode 60 wherein the $EO_3$ reactor is in parallel with the EC reactor as shown in FIG. 6. FIG. 6 is a schematic diagram of the parallel mode 60 of EC+$EO_3$ technique according to another embodiment of the invention. In the parallel mode 60, $O_3$ gas is formed in $EO_3$ reactor at step CP3 without exposing the anodes to harmful pollutants for long service life. A fresh water 600, such as, tap water, is circulated in lines 620 and 640 as the precursor of ozone. Using a vacuum pump or Venturi tube, $O_3$ gas is evacuated, via line 604, into the EC reactor. By a water pump, a contaminated liquid, whether aqueous or non-aqueous, is flown from step CP1 into EC reactor for the combinatory treatment at step CP2. In the combo treatment, a paramagnetic sludge is formed in a quantity decided by the EC power and $O_3$ gas dosing. Most of the sludge is found in the EC reactor and a magnetic separator of step CP3, and the rest is present at step CP4, micro- or ultra-filtration. Sludge is collected for post treatment at step CP9 into recyclable solids. After the combo treatment. CP2, and filtration, CP3-4, the water is examined at step CP5 on its cleanliness, for repeated treatments of CP2-CP4 via line 601, or for storage at step CP6. Then, at step CP7, the clean liquid is used for production or other purpose.

Example 1

Without adjustment, raw seawaters taken from Taiwan Strait are treated by the EC+$EO_3$ method in parallel mode 60 using a system as depicted in FIG. 6. Followings are the dimensions of EC reactor and $EO_3$ generator along with their respective electrode packs:

EC Reactor

Housing: Cylindrical plastic tube of 17 cm inner diameter and 50 cm in height. It can contain 9 liters (9 L) water for treatment. Seawater is circulated between the EC vessel and an open bucket of 20 L volume for the EC+$EO_3$ treatment.

Electrode: 2 Fe plates and 2 Al plates, each at 11.5 cm wide, 27 cm long and 0.1 cm thick, in bipolar configuration as described in FIG. 1. However, the polarities of the two outer electrodes, Fe and Al, are switched as indicated in Table 2.

The electrode stack is disposed 3 cm above water to protect the electrode leads from corrosion.

DC Power Supply: 100V/60 A.

$EO_3$ Generator

Housing: Same as the EC reactor. The generator uses a close container that holds 20 L tap water for $O_3$ formation. A pump is employed to circulate tap water between $O_3$ generator and water reservoir.

Electrode: The electrode stack consists of 5 home-made Ti/Sb,Ni—$SnO_2$ anodes sandwiched by 6 stainless cathodes, wherein each electrode is a plate of 7.5 cm wide×25 cm long×0.1 cm thick, in mono-polar configuration as described in FIG. 2. However, supercapacitor is not employed for the operation current of Exp 1 is well within the current range of DC power supply used. The electrode stack is disposed 2 cm above water to protect the electrode leads from corrosion.

Vacuum pump: It provides a vacuum of 50 cm Hg (9.67 psi) for withdrawing $O_3$ gas from $EO_3$ generator to EC reactor.

DC Power Supply: 30V/200 A.

Test Method

Since the fundamental of the EC+$EO_3$ method is established, only the levels of operation voltage of EC and $EO_3$, water flow rate in EC reactor and the treatment time of EC+$EO_3$ need to be determined. Three levels of DC volts are chosen for driving EC and $EO_3$, that is, 10-20-30 V for EC and 5-7-10 V for $EO_3$. In each voltage selected for EC operation, only one trial uses Al electrode (electrode D of FIG. 1) as anode, the other two use Fe electrode (electrode A of FIG. 1) as anode.

Based on three variables, they are: EC/$EO_3$ voltage, water flow-rate and treatment time, and 3 levels for each variable, an orthogoal array known as Latin Square 9, $L_9$, developed by Genichi Taguchi, is employed for examining the performance of each parameter set used by EC+$EO_3$ to treat seawaters. The TDS values of seawaters before and after the EC+$EO_3$ treatment are measured for assessing the treatment effects of EC+$EO_3$ under each set of operation parameters. The results are listed in Table 2.

TABLE 2

| Seawater Pretreated by EC + $EO_3$ | | | | | | | | | |
|---|---|---|---|---|---|---|---|---|---|
| Raw | | EC | | $EO_3$ | | | | Treated Water | |
| # | TDS | A | V | I | V | I | FR | TT | TDS | ΔTDS |
| 1 | 30.7 | Fe | 10 | 11.8/13.4 | 5 | 4.2/3.7 | 5 | 10 | 30.4 | −0.3 |
| 2 | 29.8 | Al | 10 | 13.9/15.4 | 7 | 8.4/17.3 | 10 | 20 | 29.3 | −0.5 |
| 3 | 17.3 | Fe | 10 | 10.2/11.4 | 10 | 16.1/14.4 | 20 | 30 | 18.3 | −1.0 |
| 4 | 30.0 | Al | 20 | 32.5/40.9 | 10 | 15.1/13.5 | 5 | 20 | 30.4 | +0.4 |
| 5 | 29.1 | Fe | 20 | 27.9/39.3 | 5 | 4.1/13.8 | 10 | 30 | 27.0 | −2.1 |
| 5' | 17.6 | Fe | 20 | 26.7/38.5 | 5 | 3.6/12.2 | 10 | 30 | 15.4 | −2.2 |
| 6 | 18.7 | Al | 20 | 23.8/26.6 | 7 | 8.6/7.5 | 20 | 10 | 19.1 | +0.4 |
| 7 | 30.0 | Fe | 30 | 45/60+ | 7 | 8.2/7.2 | 5 | 15 | 30.5 | +0.5 |
| 8 | 21.9 | Al | 30 | 31.8/53.4 | 10 | 14.3/13.7 | 10 | 10 | 20.8 | −1.1 |
| 9 | 18.0 | Fe | 30 | 32.6/55.3 | 5 | 3.8/3.6 | 20 | 20 | 19.5 | +1.5 |

Legends in Table 2:
TDS = total dissolved solids of seawater in ppt (parts per thousand).
ΔTDS = TDS difference of seawater before and after treatment in ppt.
A = Anode of EC.
V = operation voltage of EC and $EO_3$ in Volt.
I = operation current of EC and $EO_3$ in Ampere. Two values are recorded for each operation voltage of EC and $EO_3$ at the start and end of treatment.
FR = water flow rate in L/min.
TT = EC + $EO_3$ treatment time in minute.

In Table 2, seawaters with TDS higher than 29 ppt are raw, others were treated once or more times by the combinatory method prior to the test of Table 2. Regardless of raw or treated seawaters, they receive no chemical or adjustment before the EC+$EO_3$ treatment. In other words, all seawaters in Table 2 are subjected to the EC+$EO_3$ treatment and filtration only. Test #5 shows high ΔTDS value, which is confirmed in test #5' under the same parameter set. The reason that test #5 and #5' producing the highest ΔTDS values is that they are operated with the best combination of $Fe^{2+}/Al^{3+}$ and $O_3$ dose. If $Fe^{2+}/Al^{3+}$ are over produced and $O_3$ is insufficient, the seawater will show a higher TDS value than that before the EC+$EO_3$ treatment as seen in #9 in Table 2.

In Table 2, the EC+$EO_3$ treatment is operated in constant-voltage mode, whereas the operation currents increase with the increase of conductivity or TDS of seawater. When the operation current exceeds the current limit of power supply as in test #7 of Table 2, the operation voltage will fall from the preset level to lower voltages, such as, 30V to 25V (not listed in test #7). Using a DC power supply of constant-current type, or supercapacitor as a barrier for preventing the power supply from the interference of seawater conductivity, EC treatment can work under high voltage and low current. High volt/low ampere is a desirable operation set for the EC+$EO_3$ treatment. When supercapacitor is used to isolate the power supply from seawater, the capacitor should have a working voltage of 100V with capacitance of 10 F. Because the EC system in Example 1 is open to atmosphere, $O_3$ can escape freely. As a consequence, the EC+$EO_3$ treatment requires at least 10-minute treatment time to reduce the TDS of just 20 L seawater by 1.0 ppt. If the utilization efficiency of $O_3$ is improved, the EC+$EO_3$ treatment should attain a higher TDS reduction on more volume of seawater in a shorter time than those shown in Table 2. Nevertheless, Table 2 indicates that the EC+$EO_3$ pretreatment is capable of cutting the TDS of raw seawater in half without the use of chemicals or microbes. Pretreatment of seawater by any prevailing technique never reports 50% reduction of TDS.

In addition to the significant reduction of TDS of seawater, sludge produced in the EC+$EO_3$ treatment is not only easy to be separated from water, but it is also a valuable resource for retrieving minerals entrapped. As taught in the U.S. Pat. No. 6,190,566 issued to Tsouris et al, a high-purity magnetite ($Fe_3O_4$) particles is produced via EC treatment of a brine. Magnetite, Fe(II,III), and hematite ($Fe_2O_3$), the two major iron oxides, along with iron oxyhydroxides and other metal ions present in seawater compose the sludge of EC+$EO_3$ treatment. It is magnetite and hematite that impart sludge ferromagnetic property. Hence, the sludge can be easily and quickly retained by a magnetic field generated by a permanent magnet or an electromagnet for separation from the treated water. After most sludge is held by the magnet, filtration of the residual solids in seawater is less demanding to a filter, such as, micro-filtration. Moreover, wet sludge from the magnetic separation is easy to form a dense cake on a dewatering device, like, press filter. Subsequently, the sludge cake can be dehydrated at a mild condition, for example, 300° C. at ambient for two hours, into dry particles. Depending on the location of seawater, the sintered sludge may contain a high concentration of magnesium (Mg), calcium (Ca), potassium (K), lithium (Li) or precious metals. The aforementioned metals can be easily recovered from their concentrated states. Using $EC+EO_3$ for the pretreatment of seawater, the resulted sludge is a valuable material, a value added to desalination.

Example 2

A black, messy and strongly foul tannery effluent is treated by the $EC+EO_3$ method in parallel mode 60 of FIG. 6 as Example 1, except the cylindrical EC vessel is directly used as a close reactor for treating 9 L waste water per batch. Only two stages of $EC+EO_3$ treatment using the parameter set of #5 in Table 2 are applied to the tannery effluent for quick assessment of feasibility:

Stage 1 2-hour $EC+EO_3$ treatment followed by activated-carbon adsorption and filtration
Stage 2 1-hour $EC+EO_3$ treatment using a system as shown in FIG. 4 followed by filtration Table 3 lists the results of 2-stage treatment.

TABLE 3

Treatment of a Tannery Effluent by $EC + EO_3$

| Indices | Raw | 1st Stage | 2nd Stage |
|---|---|---|---|
| BOD (mg/L) | 2625 | 1249 | 45 |
| COD (mg/L) | 5689 | 2623 | 582 |
| TSS (mg/L) | 2578 | 210 | 32 |
| TDS (mg/L) | 17,000 | 14,900 | 12,700 |
| $NH_3$—N (mg/L) | 246 | 153 | 66 |
| $Cr^{6+}$ (mg/L) | 3 | 1.2 | 0.3 |
| pH | 6.1 | 7.6 | 8.3 |
| Coloring | Black | Clear→light brown | Crystal Clear |

Figure 7:
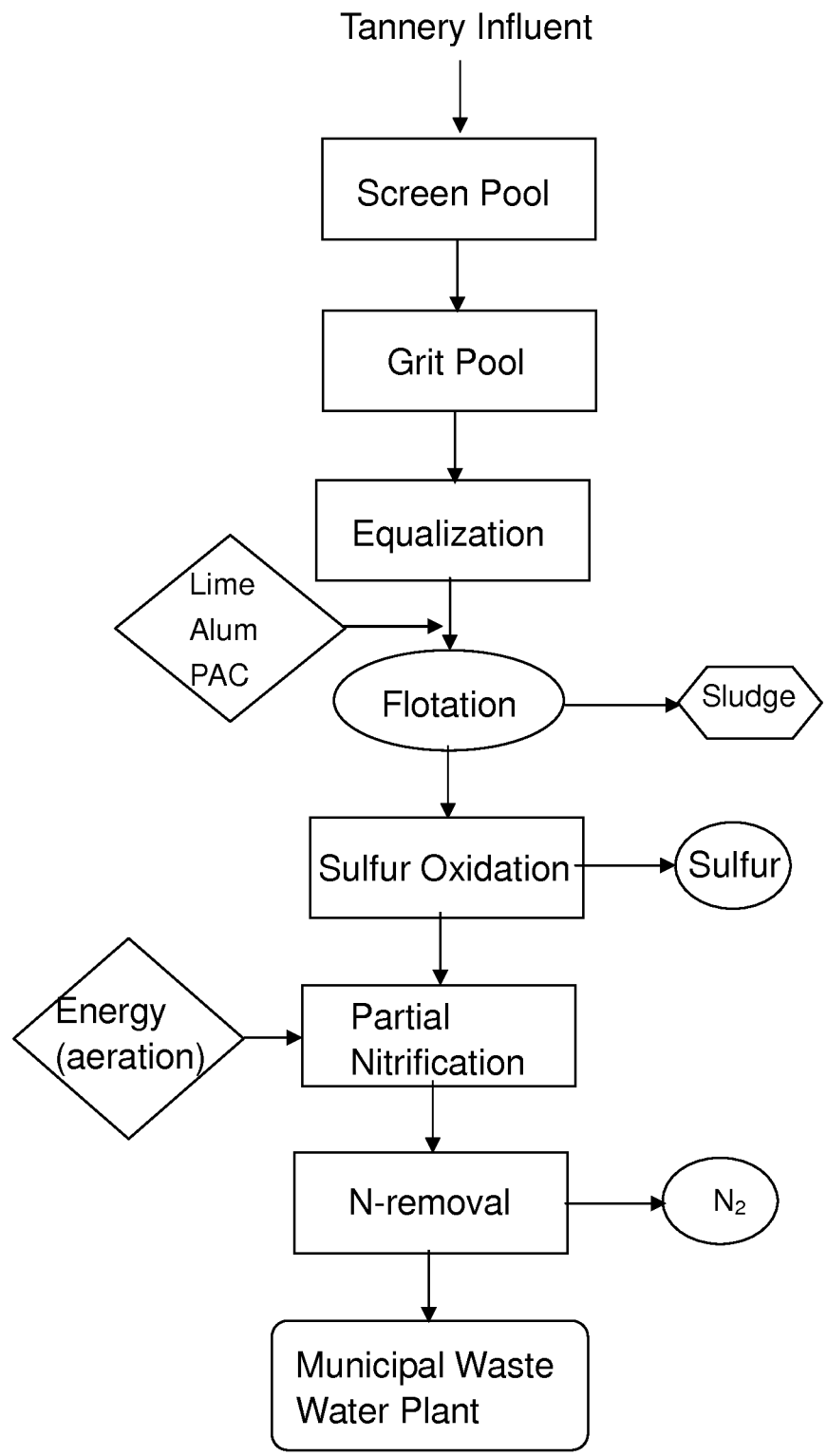
FIG. 7 is a flow process of a prior treatment for tannery waste water that employs chemicals and microbes.

Because the goal of Example 2 is a feasibility investigation of remedying a tannery effluent by $EC+EO_3$, thus, the process parameters of the $EC+EO_3$ technique are not optimized. Nevertheless, comparing to a prior treatment of tannery waste water as shown in FIG. 7, the $EC+EO_3$ treatment is clearly more effective and more economic in terms of: facility footprint, processing procedures, chemicals and microbes usage, and power consumption (a lot of power is consumed at aeration of FIG. 7). Moreover, the sludge of FIG. 7 is contaminated with the chemicals applied, yet the sludge produced in the $EC+EO_3$ treatment is a mixture of iron oxides, carbon, as well as biological and organic materials. The latter is easy to dehydrate into odorless and nourishing fertilizer. Virtually, there is no disposal cost on handling sludge produced in the $EC+EO_3$ treatment of tannery effluent. On the contrary, sludge of the $EC+EO_3$ treatment is a valuable byproduct. Except TDS, Table 3 indicates that the $EC+EO_3$ technique has the capability of becoming a clean, economic and complete solution for the remediation of tannery effluent.

At the first stage of $EC+EO_3$ treatment, the filtrate was clear originally, but it turned into light brown after sitting a few days. The foregoing discoloration could be due to that an ingredient of the partially treated waster is sensitive to air or light. Apparently, the discoloring component is eliminated at the second stage of $EC+EO_3$ treatment as the filtrate remains crystal clear indefinitely. Assuming an equal opportunity for $Fe^{2+}$ and $Al^{3+}$ to be formed in the EC reactor, also based on average EC current of 33.6 A, the theoretical production of $Fe^{2+}$ and $Al^{3+}$ can be calculated via Equation 3 as follows:

$Fe^{2+}$ formed=33.6×55.85×1000/96485×2=9.72 mg/sec $Al^{3+}$ formed=33.6×26.98×1000/96485×3=3.13 mg/sec Similarly, the total anode area of $EO_3$ submerged in water is 1725 $cm^2$ [(7.5 cm×23 cm)/side×10 sides]. Based on the ozone throughput of 0.4 $mg/cm^2$·min, the theoretical production of $O_3$ is 690 mg/min. In every minute process of $EC+EO_3$ treatment, the dose of $O_3$ is merely 1.18 times of the formation of $Fe^{2+}$, which is far below the required threshold of 20 times. By increasing the $O_3$ throughput in conjunction with the reduction of EC current for creating the desired $O_3/Fe^{2+}$ ratio, a faster and more thorough treatment on the tannery effluent than the results of Table 3 will then be delivered by the $EC+EO_3$ treatment.

CONCLUSION

The invention has combined two independent electrochemical techniques for water treatment, namely, EC and $EO_3$, into an innovative method, $EC+EO_3$. Particularly, when $Fe^{2+}$ from EC reacts with $O_3$ from $EO_3$, several powerful oxidants including .OH, $FeO_4^{2-}$ and $[Fe(IV)O]^{2+}$ will be generated. The aforementioned oxidants are several-order more reactive than the reagents produced in EC, $EO_3$ or $EC/EO_3$ connected in-tandem. By means of the synergistic effects, the $EC+EO_3$ method can treat a broader range of waste waters at larger water volume than EC and $EO_3$ working alone. In the present invention, the "proof of principle" and "proof of performance" of the $EC+EO_3$ technique on treating seawater and tannery effluent have been validated. Actually, in-house studies have discovered that the $EC+EO_3$ treatment is also applicable to effluents from the following industries, such as, food, textile, paper, dairy, meat, metal, mining, petroleum, pharmaceuticals, plastics, chemicals, semiconductor and plating. In all treatments, the $EC+EO_3$ method offers the benefits of pollution free, high throughput (fast treatment), small footprint, low operation cost, low disposal cost and no waste. In many cases, sludge produced in the $EC+EO_3$ treatments is a useful resource.

What is claimed is:
1. A combinatory means for waste water treatments comprising:
an electrocoagulation reactor (EC), comprising at least one first anode, at least one first cathode, an EC vessel for containing the at least one first anode and first cathode, and at least one first power supply, wherein the at least one first power supply comprises a first positive pole connected to the at least one first anode, a first negative pole connected to the at least one first cathode, and at least one first supercapacitor;
an electrolytic ozone ($EO_3$) generator, comprising at least one second anode having a thin film of tin oxide that is made from a carboxylate compound of tin, at least one second cathode, an $EO_3$ vessel for containing the at least one second anode and second cathode, at least one source of water as precursor of ozone connected to the $EO_3$ vessel, and at least one second power supply, wherein the at least one second power supply comprises a second positive pole connected to the at least one second anode, a second negative pole connected to the at least one second cathode, and at least one second supercapacitor; and at least one vacuum pump, connecting the EC vessel and the EO3 vessel for transferring ozone gas from the EO3 vessel to the EC vessel.

2. The combinatory means for waste water treatments as claimed in claim 1, wherein the first anode and the first cathode of the EC reactor are selected from a group of metals containing Al, Fe, Cu, Ni, Ti, Ag, Mg and stainless steel.

3. The combinatory means for waste water treatments as claimed in claim 1, wherein the second anode of the EC reactor is dissolved by applying a DC or an AC power to the first anode submerged in water.

4. The combinatory means for waste water treatments as claimed in claim 3, wherein the first power supply for the EC reactor provides a voltage of 10V or higher.

5. The combinatory means for waste water treatments as claimed in claim 2, wherein the first anode and the first cathode of the said EC are arranged in a bipolar configuration.

6. The combinatory means for waste water treatments as claimed in claim 1, wherein the second anode the second cathode of the $EO_3$ generator are perforated metallic plates with a plural number of through holes.

7. The combinatory means for waste water treatments as claimed in claim 1, wherein the second anode and the second cathode of the $EO_3$ generator can be submerged in waste waters.

8. The combinatory means for waste water treatments as claimed in claim 1, wherein the said precursor of ozone is selected from a group of materials containing tap water, freshwater and waste water.

9. The combinatory means for waste water treatments as claimed in claim 1, wherein the EC reactor can provide ferrous ion ($Fe^{2+}$) and aluminum ion ($Al^{3+}$).

10. The combinatory means for waste water treatments as claimed in claim 1, wherein the vacuum pump can provide a vacuum of 10 psi or higher.

11. The combinatory means for waste water treatments as claimed in claim 1, wherein sludge is produced in a combinatory reaction of the EC reactor and the $EO_3$ generator.

12. The combinatory means for waste water treatments as claimed in claim 11, further comprising at least one means for providing magnetic field to retain the sludge, wherein the means is a permanent magnet or an electromagnet.

13. The combinatory means for waste water treatments as claimed in claim 1, wherein the first supercapacitor in the first power supply to the EC reactor has an electric specification of 100 V and 10 F.

14. The combinatory means for waste water treatments as claimed in claim 1, wherein the second supercapacitor in the second power supply to the $EO_3$ generator has an electric specification of 30 V and 20 F or higher capacitance.

15. The combinatory means for waste water treatments as claimed in claim 13, wherein the first supercapacitor is 100V per piece, or supercapacitor with high unitary voltage.

16. The combinatory means for waste water treatments as claimed in claim 14, wherein the second supercapacitor is 30V per piece, or supercapacitor with high unitary voltage.

* * * * *